United States Patent [19]
Brock

[11] 3,721,358
[45] March 20, 1973

[54] SELF-LOADING CARRIER

[76] Inventor: Gibson E. Brock, R.D. No. 5, Persimmon Road, Sewickley, Pa. 15143

[22] Filed: Nov. 12, 1970

[21] Appl. No.: 88,530

[52] U.S. Cl. .................214/394, 212/14, 212/141, 280/81.5, 280/423 R
[51] Int. Cl. .............................................B60p 3/40
[58] Field of Search .........214/392, 394, 396, 16.4 B; 212/13, 14, 141; 280/423 R, 404, DIG. 9, 81.5

[56]          References Cited

UNITED STATES PATENTS

| 2,954,136 | 9/1960 | Butler et al. | 214/394 |
| 3,059,782 | 10/1962 | Baudhun | 214/141 X |
| 3,081,883 | 3/1963 | Minty | 214/394 X |
| 3,511,398 | 5/1970 | Lyster et al. | 214/394 |
| 2,373,398 | 4/1945 | Hoobler | 280/423 R |

FOREIGN PATENTS OR APPLICATIONS

| 1,003,719 | 11/1951 | France | 214/394 |

Primary Examiner—Robert G. Sheridan
Assistant Examiner—George F. Abraham
Attorney—G. R. Harris and T. A. Zalenski

[57] ABSTRACT

An over-the-road carrier adapted to straddle and pick up elongated loads such as billets, pipe, etc., stocked in parallel piles on the ground between aisles is pivotally mounted at its front end on a tractor unit and at its rear end on a remote control powered trailing end unit. the latter unit is rotatable from a position in which its wheels travel in the direction of the long axis of the carrier to a position at right angles thereto. The carrier is maneuverable from its traveling position to its loading position by steering its tractor unit into one aisle, rotating its trailing end unit 90° and then driving the trailing end unit into the other aisle so that the carrier pivots about its tractor unit into a position parallel to the long axis of the load. Both tractor and trailing end units are then driven along their respective aisles to position the carrier over the desired load.

1 Claim, 7 Drawing Figures

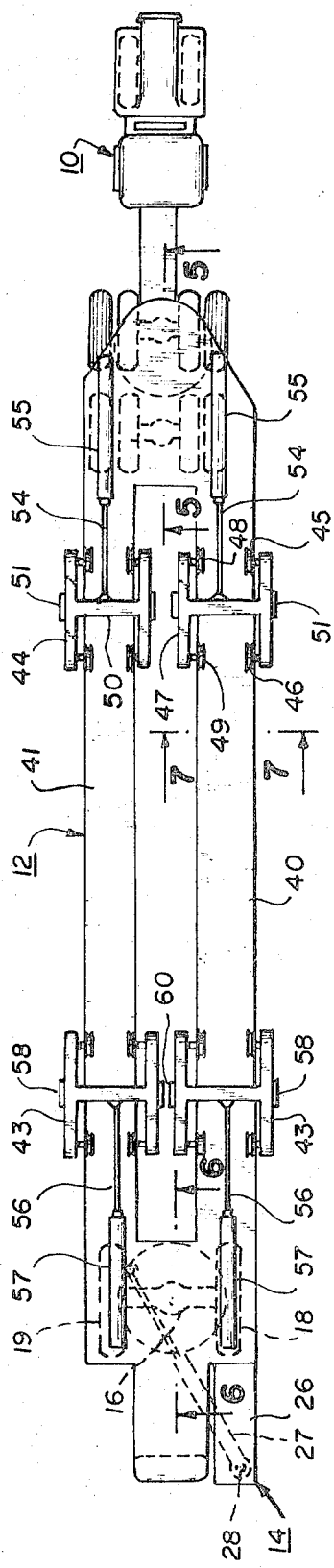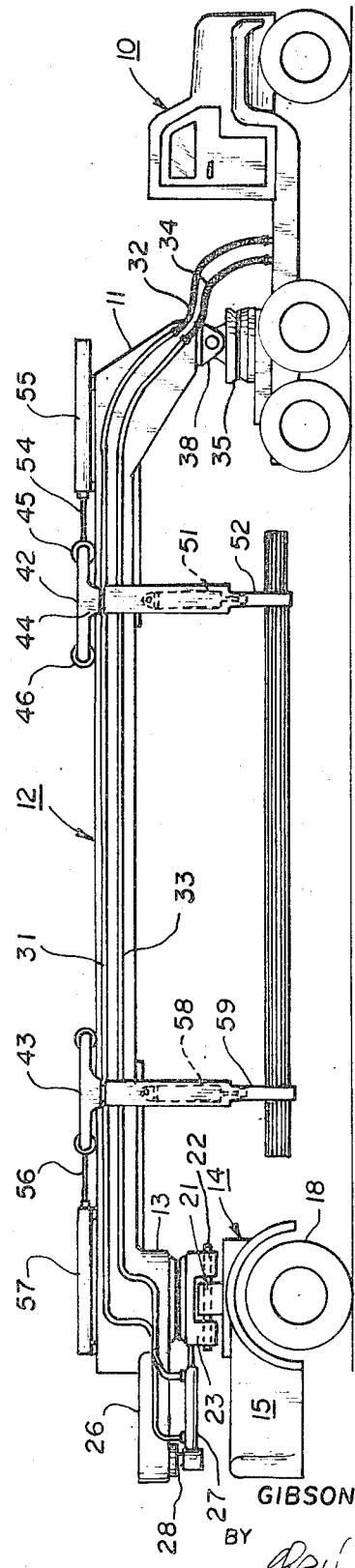

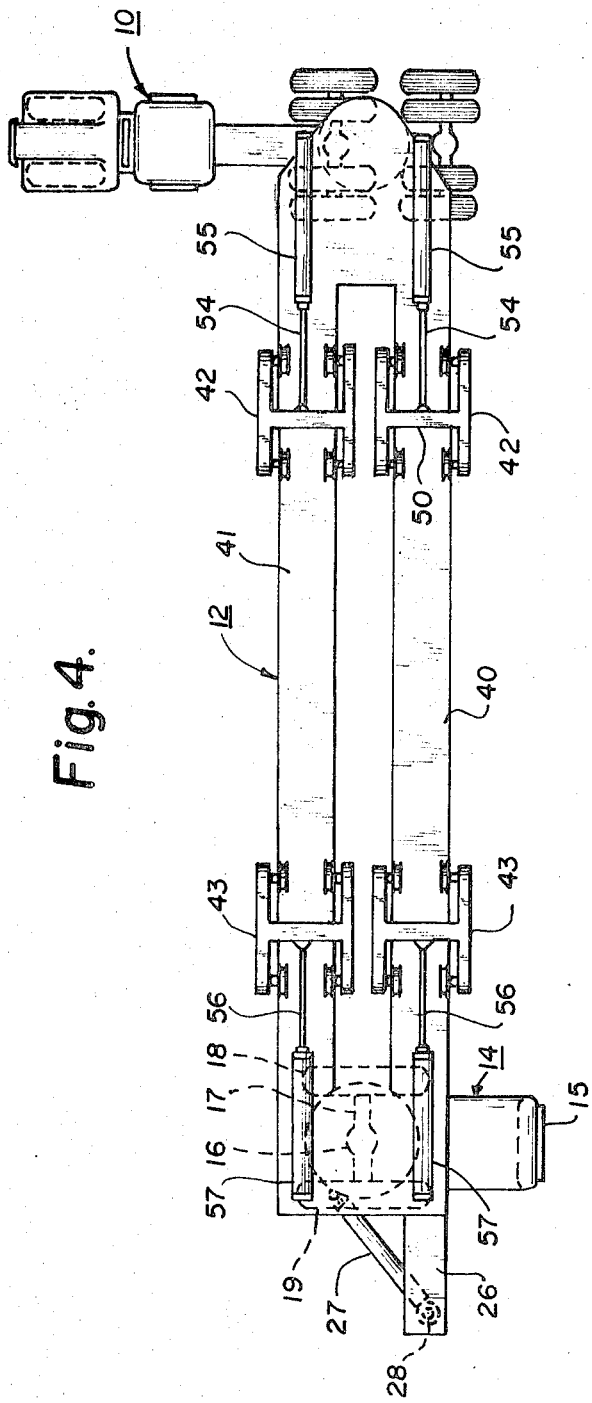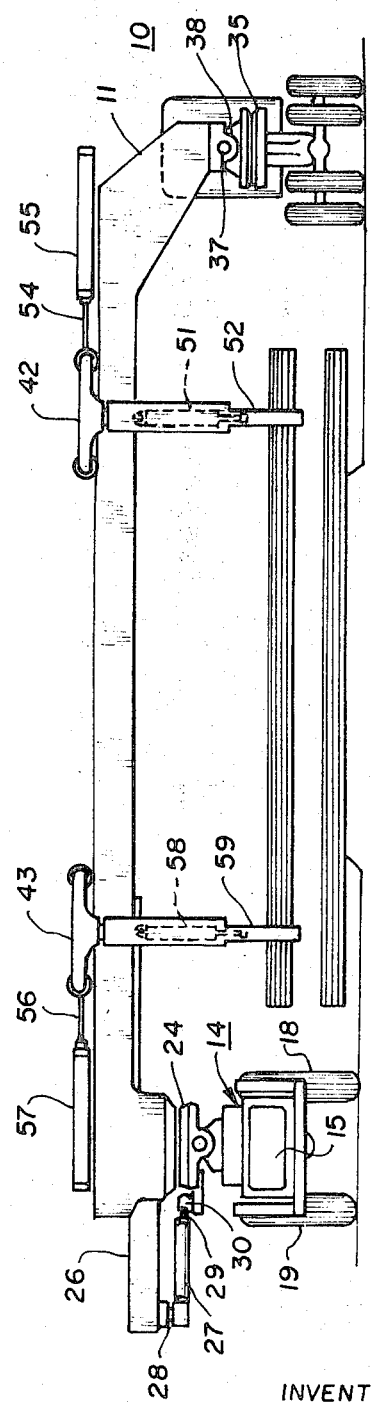

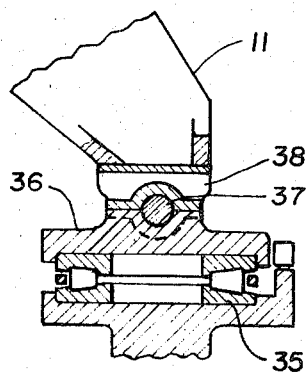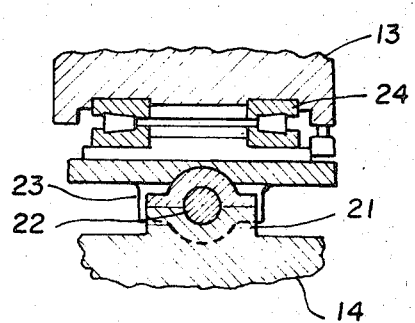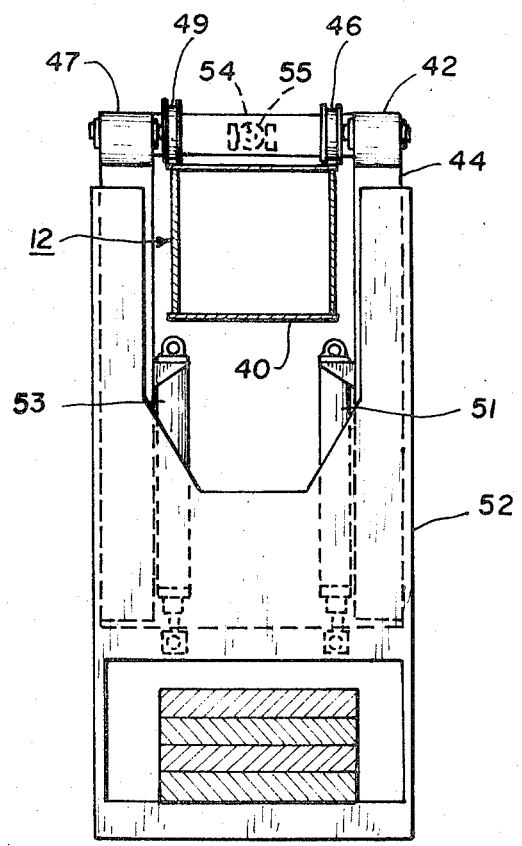

SELF-LOADING CARRIER

This invention relates to self-loading carriers. It is more particularly concerned with over-the-road carriers capable of picking up and depositing loads of elongated articles between parallel aisles.

In manufacturing operations, it is often necessary to stack elongated articles, such as billets, pipe, bars, structural sections and the like between processing steps, or between manufacture and shipment. Not infrequently, it is necessary to move such articles from stock to remote locations. Conventionally, the articles are taken from stock, loaded onto a railroad car, or an over-the-road vehicle, transported to their destination and then unloaded. The loading and unloading require suitable apparatus at each end of the trip, as well as crews for performing the loading and unloading operation and for operating the apparatus.

In general, the cheapest way to stock such articles is on the ground, supported so that a sling or other lifting device can pass under their opposite ends. In the case of semi-finished material, such stocking may be done out of doors. In the stockyard, the piles or bundles of elongated articles are generally laid down parallel to each other between parallel aisles. The aisles are usually at right angles to the long axes of the bundles. It is conventional to employ cranes to pick up such articles from the place where they are stocked and carry them to the railroad car or truck for shipment. For short transfers mobile gantry cranes can be used, but they are not adapted for over-the-road use as they are relatively slow speed vehicles and not built to allow for the hilly and uneven surfaces of roadways. Thus, conventionally, each elongated load must be handled by three different pieces of apparatus each operated by its own crew between the origin and destination of the load.

It is an object of my invention to provide apparatus which can travel along the aisles of a stockyard straddling the bundles stored therein, pick up a bundle therefrom, carry that bundle back to the roadway, over the road to its destination, and deposit it again in a similar stockyard, if desired. It is another object to provide such apparatus which can travel along a roadway and also move along aisles transverse thereto to pick up and deposit elongated loads. It is still another object to provide such apparatus which requires only a single operator. Other objects of my invention will appear in the course of the description thereof which follows:

An embodiment of my invention presently preferred by me is illustrated in the attached figures to which reference is now made.

FIG. 1 is an elevation of my apparatus in its traveling position;

FIG. 2 is a plan view of the apparatus of FIG. 1;

FIG. 3 is an elevation of my apparatus in its loading position;

FIG. 4 is a plan view of the apparatus of FIG. 3;

FIG. 5 is a cross-section of the tractor pivot mechanism, taken on the plane 5—5 of FIG. 2;

FIG. 6 is a cross-section of the trailing end pivot mechanism, taken on the plane 6—6 of FIG. 2; and FIG. 7 is a cross-section taken on the plane 7—7 of FIG. 2 showing the load engaging and lifting mechanism.

My apparatus comprises broadly three elements, a load carrying unit 12, supported at its front end 11 by a tractor unit 10, and at its rear end 13 by a trailing end unit 14. The tractor unit 10 has a conventional internal combustion engine and is otherwise conventional except for the pivot mechanism illustrated in FIG. 5 which will be described hereinafter; otherwise, tractor unit 10 requires no description. The trailing end unit 14 comprises an engine 15 which is a conventional internal combustion engine and which is connected through a clutch and gear box containing a reverse gear, not shown, and a conventional differential 16 to an axle 17 upon which are mounted wheels 18 and 19.

Trailing end unit 14 supports end 13 of unit 12 by means of the pivot mechanism illustrated in FIG. 6. From the upper surface of trailing end unit 14 above axle 16 projects an element 21 provided with a horizontal pin 22 positioned at right angles to axle 16. The ends of pin 22 project from each side face of element 21 and are journaled in bearings mounted in a clevis 23 so that the latter can pivot freely about pin 22. Clevis 23 is provided on its face opposite pin 22 with a horizontally disposed thrust bearing 24 which preferably is a tapered roller bearing as is illustrated in FIG. 6. This bearing 24 is also fastened to the lower face of end 13 of load carrying unit 12 so that the latter can be moved pivotally around the vertical axis of bearing 24. That vertical axis passes through the axes of pin 22 and axle 16 at their centers.

Load carrying unit 12 at its end 13 is provided with an arm 26 which projects rearwardly beyond thrust bearing 24. In its traveling position, trailing end unit 14 is arranged so that its engine 15 is behind its axle 16. A hydraulic cylinder 27 is connected by a pivot 28 to the projecting end of arm 26. The piston rod 29 of cylinder 27 is connected by a pivot 30 to clevis 23. The pivot end 28 of hydraulic cylinder 27 is connected to a fluid conduit 31 which is fastened to load carrying unit 12 and traverses its length to front end 11, where, through flexible hose 32, it is connected to conventional hydraulic pump and control means, not shown, in tractor 10. A similar fluid conduit 33 is connected to the opposite end of hydraulic cylinder 27 and likewise is attached to load carrying unit 12 throughout its length to front end 11, and through a similar hose 34 to the apparatus previously mentioned in tractor 10. The trailing end unit 14 is provided with brakes for its wheels 18 and 19 and controls for its gear box and engine. All these controls are likewise connected, through conventional flexible means where necessary, by means of load carrying unit 12, to tractor 10. They may be hydraulic in nature, in which case the connections are conduits similar to conduits 31 and 32, or they may be other conventional remote controls.

Front end 11 of load carrying unit 12 is pivotally mounted on tractor 10 through the mechanism illustrated in detail in FIG. 5. On tractor 10 is mounted a horizontally disposed thrust bearing 35 which is similar to thrust bearing 24 previously described. The upper face of thrust bearing 35 is attached to an upwardly projecting element 36 carrying a horizontally disposed pin 37, similar to projection 21 and pin 22 previously described. Front end 11 of load carrying element 12 is provided with a downwardly projecting clevis 38 which carries bearings in which the pin 37 is journaled transversely of load carrying unit 12. The axis of pin 37 intersects the vertical axis of thrust bearing 35.

Load carrying unit 12 between its ends 11 and 13 comprises parallel beam units 40 and 41. Beam 40 supports a front trolley 42 and a rear trolley 43 which are identical and beam 41 likewise supports front and rear trolleys which are identical with those on beam 40. Trolley 42 is provided with a longitudinally extending side member 44 fitted with wheels 45 and 46 which rest on the outside edge of beam 40. Trolley 42 is also provided with a second longitudinal member 47 parallel to member 44 and spaced therefrom which is fitted with wheels 48 and 49 which rest on the inside edge of beam 40. Members 44 and 47 are connected by cross member 50. From side member 44 depends a hydraulic lifting cylinder 51, and from side member 47 depends a like hydraulic lifting cylinder 53, best shown in FIG. 7. These cylinders at their lower ends are fitted with a load engaging yoke 52 dimensioned to fit around the end of a load bundle. Cross member 50 is connected to the piston rod 54 of horizontally disposed hydraulic cylinder 55 carried by the front end 11 of load carrying element 12. Cylinders 51 and 55 are connected at their front and back ends with a source of hydraulic fluid carried by tractor 10 by means of conduits and hoses which are not shown as they are conventional. Trolley 43 is constructed in the same manner as is trolley 42 and is provided with load lifting elements of the same type, including depending hydraulic cylinders 58 and 60 provided with a load engaging yoke 59. It is moved along beam 40 by piston rod 56 of a hydraulic cylinder 57 positioned at the rear end 13 of load carrying unit 12. The trolleys on beam 41 are constructed in the same way as those on beam 40.

The operation of my apparatus will be described also with reference to the figures previously mentioned. While it is traveling along the roadway, the apparatus is disposed as it appears in FIGS. 1 and 2. Tractor 10 pulls load carrying unit 12, the rear end 13 of which is supported by trailing end unit 14. Engine 15 of unit 14 may or may not be used for over-the-road travel. If it is not used for this purpose, but merely for positioning the apparatus over the load, as will be described hereinafter, its gear box requires only a forward and reverse gear at a relatively low speed. Its clutch is let out for over-the-road travel and its engine is not operated. If engine 15 is used during over-the-road travel, it requires a gear box similar to that of tractor 10 or a suitable automatic transmission.

During over-the-road travel with my apparatus hydraulic fluid is admitted into cylinder 27 through conduit 30, which causes piston rod 29 to extend fully. In this position it braces trailing element 14 against extension 26 so that trailing unit 14 cannot pivot on thrust bearing 24 but remains locked in alignment with load carrying unit 12. Clevis 23 and pin 22 permit tilting of axle 17 with respect to load carrying unit 12 without the transmission of stress to the latter unit. Thrust bearing 35 permits pivotal movement in the horizontal plane of tractor unit 10 with respect to load carrying unit 12 for turning corners. Clevis 38 and pin 37 permit pivotal movement in the vertical plane of tractor unit 10 with respect to load carrying unit 12 and so allow for humps and hollows on the roadway. When the tractor unit 10 is turned 90° with respect to load carrying unit 12, the latter unit is still stable because pin 37 is always transverse to load carrying unit 12.

My apparatus normally approaches a stocking area along a driveway inclined to the aisles thereof at some angle. For the purposes of this description it will be assumed that the angle is a right angle. The aisles are laid out parallel to each other and are spaced apart a distance approximately the same as the length of the load carrying unit 12 of my apparatus. The successive individual load bundles each comprising a pile of aligned elongated articles are laid down on blocks or earth mounded up to provide a platform elevated somewhat above the ground level of the aisles and extending over the central portion of the space between them. This central portion is of lesser width than the length of the load bundles so that both ends of the load bundles project beyond the platform as is shown in FIG. 3. The load bundles are positioned at right angles to the aisles.

As the apparatus approaches the pair of aisles spanning the load bundle to be picked up, which for the purposes of this description will be considered to be on the left hand side of the driveway, the driver of the tractor begins to steer tractor 10 so as to turn it into the aisle beyond the load bundle in the direction of travel of my apparatus. As the tractor 10 moves into that aisle load carrying unit 12 pivots on thrust bearing 35 so as to bridge diagonally the corner between the roadway and the aisle. Trailing end unit 14 remains locked in alignment with load carrying unit 12 as has been previously described. Its differential 16 permits its wheels 18 and 19 to rotate at different speeds without skidding. When tractor 10 is aligned with its aisle and is at right angles to its traveling position on the roadway the driver stops it. He then admits hydraulic fluid to conduit 31 and allows it to escape from conduit 30. This causes the piston and piston rod 29 of hydraulic cylinder 27 to move toward end 28 thereof and the piston rod 29 pulls trailing end unit 14 through an angle of 90° about the axis of thrust bearing 24 into a position at right angles to the long axis of load carrying unit 12. Again the differential 16 of trailing end unit 14 permits the wheels 18 and 19 to rotate in opposite directions without skidding during this pivoting movement. In its 90° position, trailing end 14 is locked by hydraulic cylinder 27 and piston rod 19 just as it was in its aligned position previously described.

The driver then starts up engine 15, if it has not been running, and puts its gear box in its forward position, which causes trailing end unit 14 to swing load carrying unit 12 about its pivot in thrust bearing 35. When load carrying unit 12 reaches a position at right angles to tractor 10 the apparatus is disposed as it appears in FIG. 4 with tractor 10 and trailing end unit 14 in the respective aisles adjoining the ends of the load bundle. In this position, the driver operates the engines both of tractor 10 and trailing end unit 14 to move the apparatus as a straddle carrier along the aisles and position it over the desired load bundle stocked therebetween.

When my apparatus is properly positioned, as described above, trolleys 42 and 43 are moved along beam 40 into positions just beyond the respective ends of the load bundle by admitting hydraulic fluid into appropriate ends of hydraulic cylinders 55 and 57, respectively. Yokes 52 and 59 are then lowered by admitting hydraulic fluid into the upper ends of hydraulic cylinders 51, 53, 58, and 60, respectively, and are positioned under and around the ends of the load bundle by moving trolleys 42 and 43 toward each other. The load is raised by admitting hydraulic fluid to the lower ends of hydraulic cylinders 51, 53, 58, and 60. My apparatus then moves along the aisles back to the roadway in a sequence of operations which is the reverse of that previously described.

My apparatus has been described and illustrated as having two parallel beams 40 and 41 each equipped with trolleys and load engaging means so that it can pick up and carry two load bundles on the same trip. It will be understood, however, that my apparatus may be constructed with a single such beam, or with more than two such beams, as the nature of the load bundles requires. Likewise, the load engaging means need not be yokes but may be hooks, tongs, slings, magnets, or other means appropriate to the loads being handled.

Those skilled in the art will appreciate that apparatus embodying my invention may take forms other than the preferred embodiment herein described. In particular, the pivot mechanisms illustrated in FIGS. 5 and 6 may be constructed with elongated vertical pivot pins journaled in a plurality of thrust bearings spaced from each other. The horizontal pin may likewise be supported by bearings different in construction and number from those shown. The steering mechanism for the trailing end unit 14 may also take other forms, such as pinion and segment, and may be capable of turning the trailing end unit through an angle greater than 90°, as long as it is capable of locking or being locked in the 0° and 90° positions.

I claim:

1. An over the road vehicle comprising a powered tractor unit, a single trailing end unit having one axle only and provided with a source of driving power, an inverted, generally U-shaped elongated load carrying unit supported at its front and rear ends by the tractor unit and trailing end unit, respectively, and providing the sole connection therebetween, and provided with means for carrying loads slung below it, a horizontally disposed turntable on the tractor unit, a horizontal pivot shaft mounted transversely of the load carrying unit and coupling the forward end thereof to the turntable, a second horizontally disposed turntable mounted on the rear end of the load carrying unit, a horizontal pivot shaft extending longitudinally of the trailing end unit and coupling the trailing end unit to the rear turntable, and means between the trailing end unit and the carrying unit for rotating the trailing end unit with respect to the load-carrying unit through an angle from 0° to 90°.

* * * * *